May 12, 1931.  C. A. DUNCAN ET AL  1,804,862
COMBINED SEEDER, PACKER, AND PULVERIZER
Filed Oct. 25, 1927  2 Sheets-Sheet 2
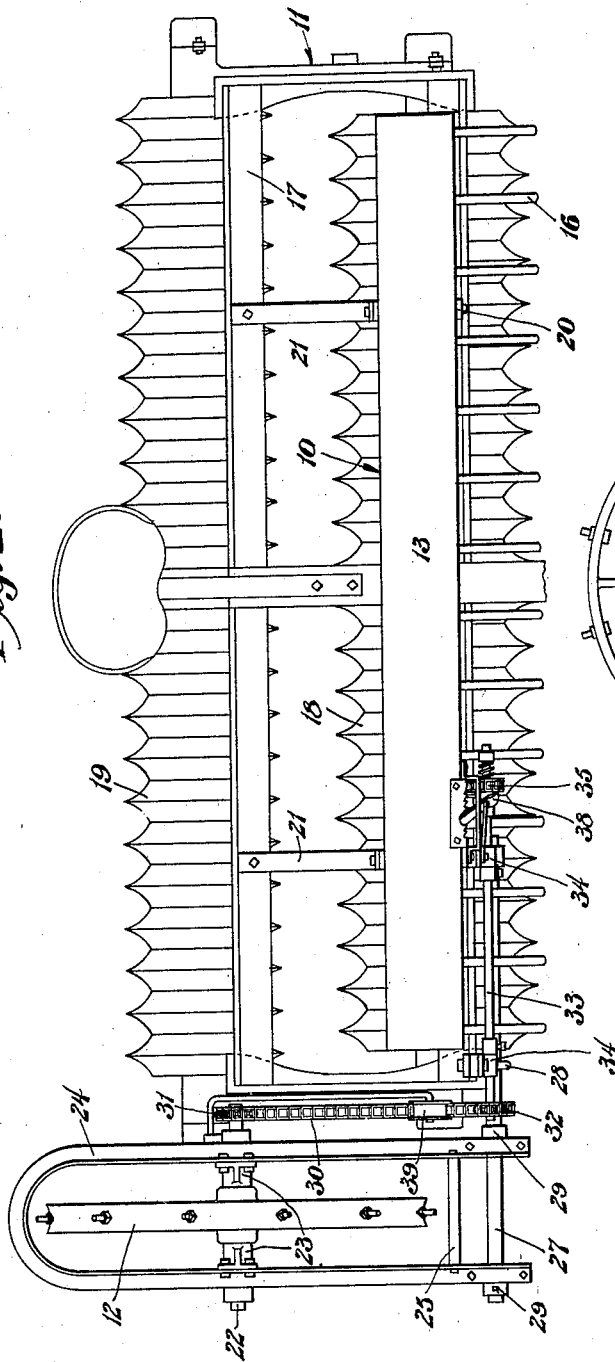
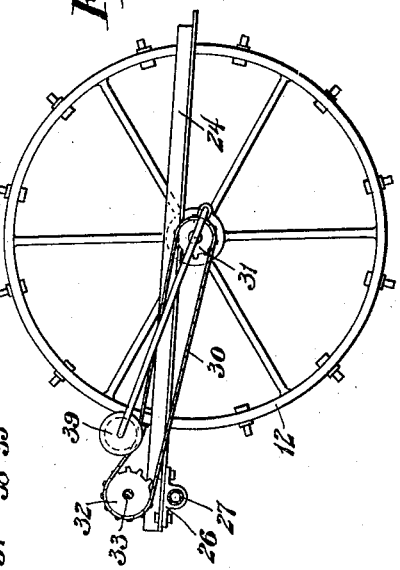
Cecil A. Duncan and
Thomas W. Morefield
INVENTORS
BY
ATTORNEYS Patented May 12, 1931

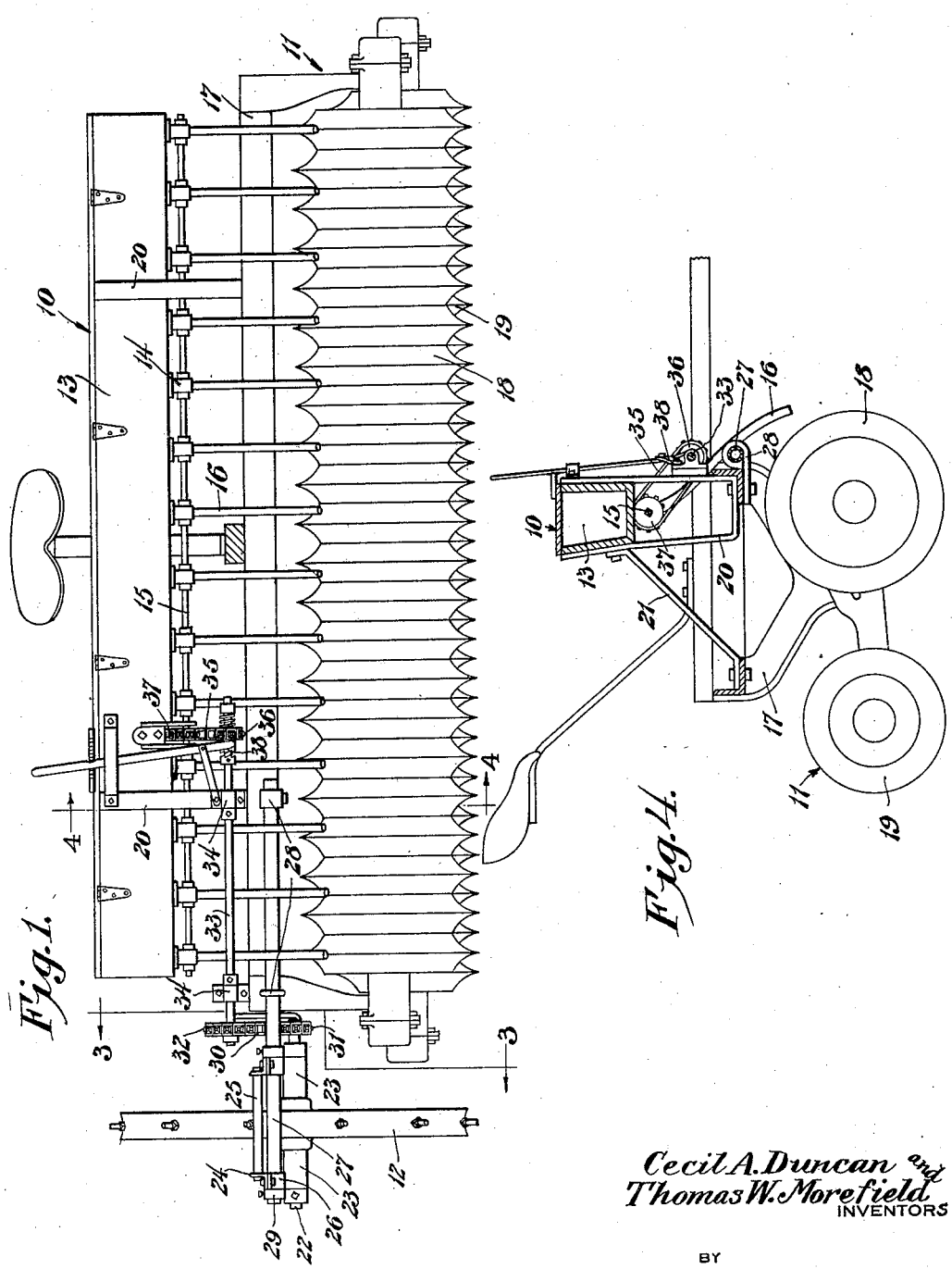

1,804,862

UNITED STATES PATENT OFFICE

CECIL A. DUNCAN AND THOMAS W. MOREFIELD, OF PULASKI, VIRGINIA

COMBINED SEEDER, PACKER, AND PULVERIZER

Application filed October 25, 1927. Serial No. 228,657.

This invention relates to a combined seeder, packer, pulverizer and roller, and aims, among other objects, to provide a machine of this type which will perform the functions heretofore requiring two machines:

In the drawings showing an embodiment of the invention in its preferred form;

Fig. 1 is a front elevation of the machine;
Fig. 2 is a top plan view of the same;
Fig. 3 is a vertical sectional view taken on the line 3—3 of Fig. 1; and
Fig. 4 is a similar view taken on the line 4—4 of Fig. 1.

Referring particularly to the drawings, there is shown a multiple spout seeder 10 detachably mounted on the frame of a combined roller, pulverizer, and packer 11 to deliver seeds to be covered thereby. A ground or drive wheel 12 is connected to the frame and adapted to operate the seed delivering mechanism of the seeder.

Herein, the seeder 10 is shown as comprising a hopper 13, having feeders 14 operated by a feed shaft 15 to deliver the grain or seed through suitable discharge spouts 16 in front of the roller and packer 11.

The combined packing, rolling and pulverizing machine comprises a rectangular frame 17 shown as having front and rear angle bars, and front and rear gangs of wheels or discs 18 and 19, respectively, adapted to roll over the ground and pulverize and pack the same. In Figs. 1 and 2 these rollers are shown as being grooved between the wheels or discs.

In the present instance, the seeder 10 is shown as being mounted above the frame 17 on a substantially U shaped support 20 (Fig. 4); the upstanding legs of which are connected to the front and rear walls of the hopper and the lower connecting arms secured to the front angle bar of the frame. Braces 21 may be connected to the rear wall of the hopper and to the rear bar of the frame to insure a more rigid support for the seeder.

The ground wheel for driving the feeding mechanism is located at one side of the frame and is mounted to move up or down with respect to the frame so that it will engage ground of irregular contour. Herein, the wheel is rigidly mounted on a shaft 22 journaled in suitable bearings 23 which are secured to the side bars of a substantially U shaped frame 24. The side bars of the frame 24 extend forwardly and are held spaced apart by a cross bar 25 while the free ends are provided with bearings 26, by which the frame is journaled on the outer end of a shaft 27 secured along the front end of the frame 17 by means of suitable clamps 28. Thus, the frame is free to rock on the shaft and insures that the trailing wheel will engage the ground at all times regardless of any unevenness in the ground. Moreover, lateral movement of the frame is prevented by a collar 29 secured to the shaft on each side of the frame.

The driving connection between the wheel and the seeder is shown as comprising a sprocket chain 30 passing over a sprocket wheel 31 on the inner end of the shaft 22 and a sprocket wheel 32 on the outer end of an intermediate shaft 33 which is journaled in bearings 34 above the shaft 27. A shorter sprocket chain 35 is connected to a sprocket wheel 36 on the inner end of the shaft 33 and a sprocket wheel 37 on the feed shaft 15. Any suitable clutching means such as is indicated at 38 may be employed to throw the feeding mechanism in or out of gear. Further, it is desirable to provide a chain tightener 39 which automatically takes up the slack in the chain 30 when the wheel moves up and down.

As the machine is drawn forwardly, the wheel 12 rotates by its contact with the ground and transmits power to the feeding mechanism of the seeder, which causes the seed to be delivered from the spouts in front of the rollers 18 and 19, by which they are covered.

From the foregoing description and a study of the drawings, it will be seen that a machine has been provided which will sow seed and prepare a pulverized seed bed at the same time. Moreover, the seeder and operating mechanism may be attached to the rollers now in use without any material changes.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:—

1. In combination with a combined ground roller and packer having a frame; a seed hopper supported on the frame and having feeding mechanism; a fixed shaft on the frame projecting beyond one end thereof; a U frame journaled on said shaft; a ground wheel journaled on said U shaped frame; and means connected to the wheel and to the feeding mechanism to operate the latter.

2. A seeder comprising, in combination, ground pulverizing and covering means; a frame associated with said means; a seed box detachably mounted on the frame; feeding mechanism associated with the seed box; a transverse shaft detachably secured to the frame and extending beyond one side thereof; a U shaped frame journaled on the shaft; and a traction wheel carried by the U shaped frame connected to operate the feeding mechanism.

3. A seeder comprising, in combination, ground pulverizing and covering means; a frame associated with said means; a seed hopper detachably mounted on the frame above the front end of the same; feeding mechanism for the hopper; spouts for the hopper to deliver seed in front of the ground pulverizing and covering means; a horizontally disposed shaft detachably secured to the front of the frame and extending beyond one side thereof; a U shaped frame terminally pivoted to the extended end of the shaft to permit said frame to rock thereon; a ground wheel journaled in the frame; and driving connections between the ground wheel and the feeding mechanism.

4. A seeder comprising, in combination, ground pulverizing and covering means; a frame associated with said means; a seed hopper mounted on the frame above the front end of the same; feeding mechanism for the hopper; spouts for the hopper to deliver seed in front of the ground pulverizing and covering means; a horizontally disposed shaft detachably secured to the front of the frame and extending beyond one end thereof; a wheel supporting frame having an arm terminally pivoted to the extended end of the shaft to permit the frame to rock thereon; a ground wheel journaled in the frame; an intermediate shaft mounted on the frame above the first mentioned shaft; means connected to transmit power from the ground wheel to the intermediate shaft; and means connected to operate the feeding mechanism from the intermediate shaft.

5. A seeder comprising, in combination, ground pulverizing and covering means; a frame associated with said means; a seed hopper mounted on the frame above the front end of the same; feeding mechanism for the hopper; spouts for the hopper to deliver seed in front of the ground pulverizing and covering means; a horizontally disposed shaft detachably secured to the front of the frame and extending beyond one end thereof; a U shaped frame having arms terminally pivoted to the extended end of the shaft to permit the frame to rock thereon; a ground wheel journaled in the frame; an intermediate shaft mounted on the frame above the first mentioned shaft; means connected to transmit power from the ground wheel to the intermediate shaft; means connected to operate the feeding mechanism from the intermediate shaft; and clutch means interposed between the intermediate shaft and the feeding mechanism.

In testimony, that we claim the foregoing as our own, we have hereto affixed our signatures.

CECIL A. DUNCAN.
THOMAS W. MOREFIELD.